(12) United States Patent
Hurst et al.

(10) Patent No.: US 7,910,502 B1
(45) Date of Patent: Mar. 22, 2011

(54) LIQUID SUBMERSION BALLISTIC PERFORMANCE THROUGH HYBRIDIZATION

(75) Inventors: David A. Hurst, Richmond, VA (US); Brian D. Arvidson, Chester, VA (US); Ashok Bhatnagar, Richmond, VA (US); Henry G. Ardiff, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 922 days.

(21) Appl. No.: 11/396,153

(22) Filed: Mar. 31, 2006

(51) Int. Cl.
  *B32B 27/04* (2006.01)
  *B32B 27/12* (2006.01)
(52) U.S. Cl. ............ 442/135; 442/61; 442/64; 442/85; 442/91; 442/134; 442/164; 442/168; 442/169; 442/239; 442/268; 442/366; 442/381
(58) Field of Classification Search ............ 442/61, 442/64, 85, 91, 134, 135, 164, 168, 169, 442/239, 268, 366, 381; 427/407.1
See application file for complete search history.

(56) References Cited

U.S. PATENT DOCUMENTS

| | | | | |
|---|---|---|---|---|
| 5,132,394 A | * | 7/1992 | Bockrath | 528/353 |
| 5,179,244 A | | 1/1993 | Zufle | 89/36.02 |
| 5,180,880 A | | 1/1993 | Zufle | 89/36.02 |
| 5,447,785 A | * | 9/1995 | Kishi et al. | 442/60 |
| 5,484,656 A | * | 1/1996 | Swisher et al. | 428/378 |
| 5,724,670 A | | 3/1998 | Price | |
| 5,926,842 A | | 7/1999 | Price et al. | 2/2.5 |
| 6,119,575 A | | 9/2000 | Dragone et al. | 89/36.05 |
| 6,737,368 B2 | | 5/2004 | Chiou | 442/134 |
| 6,992,138 B2 | * | 1/2006 | Tsuji et al. | 525/131 |

FOREIGN PATENT DOCUMENTS

| | | |
|---|---|---|
| WO | 02103275 | 12/2002 |
| WO | 2005001373 | 1/2005 |
| WO | 2007097780 | 8/2007 |

* cited by examiner

*Primary Examiner* — Andrew T Piziali
(74) *Attorney, Agent, or Firm* — Erika S. Wilson

(57) ABSTRACT

Ballistic resistant articles having excellent resistance to deterioration due to liquid exposure. More particularly, a ballistic resistant structures and articles formed from a hybrid of woven and non-woven fibrous components that retain their superior ballistic resistance performance after exposure to liquids such as sea water and organic solvents, such as gasoline and other petroleum-based products. The hybrid structures are particularly useful for the formation of or for use in conjunction with soft, flexible body armor.

40 Claims, No Drawings

LIQUID SUBMERSION BALLISTIC PERFORMANCE THROUGH HYBRIDIZATION

BACKGROUND OF THE INVENTION

1. Field of the Invention

This invention relates to ballistic resistant articles having excellent resistance to deterioration due to liquid exposure. More particularly, the invention pertains to ballistic resistant structures and articles formed from a hybrid of woven and non-woven fibrous components that retain their superior ballistic resistance performance after exposure to liquids such as sea water and organic solvents, such as gasoline and other petroleum-based products.

2. Description of the Related Art

Ballistic resistant articles containing high strength fibers that have excellent properties against projectiles are well known. Articles such as bulletproof vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a matrix material to form non-woven rigid or flexible fabrics.

Various ballistic resistant constructions are known that are useful for the formation of hard or soft armor articles such as helmets, panels and vests. For example, U.S. Pat. Nos. 4,403, 012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers therebetween. The composite is bonded to a hard plate to increase protection against armor piercing projectiles.

Hard or rigid body armor provides good ballistic resistance, but can be very stiff and bulky. Accordingly, body armor garments, such as ballistic resistant vests, are preferably formed from flexible or soft armor materials. However, while such flexible or soft materials exhibit excellent ballistic resistance properties, they also generally exhibit poor resistance to liquids, including seawater and organic solvents, such as gasoline and other solvents derived from petroleum. This is problematic because the ballistic resistance performance of such materials is generally known to deteriorate when exposed to or submerged in liquids. Accordingly, there is a need in the art for soft, flexible ballistic resistant materials that perform at acceptable standards after being contacted with or submerged in a variety of liquids, such as gasoline, gun lube, petroleum and water. The invention provides a hybrid combination of woven and non-woven ballistic resistant materials, at least one of which is formed with a matrix material that is resistant to both water and one or more organic solvents.

Hybrid ballistic resistant structures, in and of themselves, are known. For example, U.S. Pat. Nos. 5,179,244 and 5,180,880 teach soft or hard body armor utilizing a plurality of plies made from dissimilar ballistic materials, joining aramid and non-aramid fiber plies into a combined structure and utilizing polymeric matrix materials that deteriorate when exposed to liquids. U.S. Pat. No. 5,926,842 also describes hybridized ballistic resistant structures utilizing polymeric matrix materials that deteriorate when exposed to liquids. Further, U.S. Pat. No. 6,119,575 teaches a hybrid structure containing a first section of aromatic fibers, a second section of a woven plastic and a third section of polyolefin fibers.

The present invention provides an improved hybrid structure that incorporates the benefits of dissimilar materials and offers the desired protection from liquids. Particularly, the invention provides hybrid ballistic resistant structures incorporating at least one layer which is preferably formed with a hydrolytically stable, polar matrix material. Polar polymers are generally resistant to dissolution by non-polar organic solvents, and hydrolytically stable polymers are generally resistant to degradation due to sea water exposure. It has been discovered that matrix polymers having both properties advantageously contribute to the retention of the ballistic resistance properties of a fabric after prolonged exposure to potentially harmful liquids.

SUMMARY OF THE INVENTION

The invention provides a ballistic resistant article comprising, in order:

a) a first panel comprising at least one woven fibrous layer;

b) a second panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents; and c) a third panel comprising at least one woven fibrous layer.

The invention also provides a ballistic resistant article comprising, in order:

a) a first panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents;

b) a second panel comprising at least one woven fibrous layer; and c) a third panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents.

The invention further provides a method for forming a ballistic resistant article comprising:

a) forming a first panel comprising at least one woven fibrous layer;

b) forming a second panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents;

c) forming a third panel comprising at least one woven fibrous layer; and d) juxtaposing said first panel with said second panel, and juxtaposing said second panel with said third panel.

The invention also provides a method for forming a ballistic resistant article comprising:

a) forming a first panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents;

b) forming a second panel comprising at least one woven fibrous layer;

c) forming a third panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents; and d) juxtaposing said first panel with said second panel, and juxtaposing said second panel with said third panel.

DETAILED DESCRIPTION OF THE INVENTION

The invention presents articles that retain superior ballistic penetration resistance after exposure to water, particularly sea water, and organic solvents, particularly solvents derived from petroleum such as gasoline. For the purposes of the invention, articles that have superior ballistic penetration resistance describe those which exhibit excellent properties against deformable projectiles. The articles also exhibit excellent resistance properties against fragment penetration, such as shrapnel.

The articles include three or more individual panels, each panel comprising at least one layer of a woven fibrous material or a non-woven fibrous material. In a first embodiment, a panel comprising a plurality of non-woven fibrous layers is positioned between two opposing panels, each comprising at least one woven fibrous layer. In a second embodiment, a panel comprising at least one woven fibrous layer is positioned between two opposing panels, each comprising a plurality of non-woven fibrous layers. In each embodiment, a panel of non-woven fibrous material comprises at least one single-layer, consolidated network of fibers in an elastomeric or rigid polymer composition, which polymer composition is referred to in the art as a matrix composition. More particularly, a single-layer, consolidated network of fibers comprises a plurality of fiber layers stacked together, each fiber layer comprising a plurality of fibers coated with the matrix composition and unidirectionally aligned in an array so that they are substantially parallel to each other along a common fiber direction. The stacked fiber layers are consolidated to form the single-layer, consolidated network, uniting the fibers and the matrix composition of each component fiber layer. The consolidated network may also comprise a plurality of yarns that are coated with such a matrix composition, formed into a plurality of layers and consolidated into a fabric.

In each of the first and second embodiments, the first panel is in juxtaposition with the second panel and the second panel is in juxtaposition with the third panel. More particularly, the first panel is in immediate juxtaposition with the second panel and the second panel is in immediate juxtaposition with the third panel. Additionally, the first panel may be attached to the second panel and the second panel may be attached to the third panel, or the panels may simply be positioned face-to-face in a non-attached array.

Alternately, the articles of the invention may further comprise one or more additional panels, each panel comprising at least one woven fibrous layer or comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that is resistant to dissolution by water, and resistant to dissolution by one or more organic solvents. In a preferred embodiment of the invention, the articles of the invention comprise more than three individual panels, wherein each panel of a woven fibrous material is immediately juxtaposed with a panel of a non-woven fibrous material, such that the woven and non-woven panels alternate. Further, as previously stated, a single panel of woven fibrous material may comprise more than one woven fibrous layer. Also, a single panel of non-woven fibrous layers may include more than one single-layer, consolidated network of non-woven fibers. For example, a preferred structure of the invention comprises a first panel which comprises ten layers of a woven fibrous material, a second panel comprising ten separate single-layer, consolidated fiber networks (each single-layer, consolidated fiber network formed from two united, unidirectional fiber layers), and a third panel comprising ten layers of a woven fibrous material.

The number of layers forming a single panel, and the number of layers forming the non-woven composite vary depending upon the ultimate use of the desired ballistic resistant article. For example, in body armor vests for military applications, in order to form an article composite that achieves a desired 1.0 pound per square foot areal density (4.9 kg/m$^2$), a total of at 22 individual plies may be required, wherein the plies may be woven, knitted, felted or non-woven fabrics formed from the high-strength fibers described herein, and the layers may or may not be attached together. In another embodiment, body armor vests for law enforcement use may have a number of layers based on the National Institute of Justice (NIJ) Threat Level. For example, for an NIJ Threat Level IIIA vest, there may also be a total of 22 layers. For a lower NIJ Threat Level, fewer layers may be employed.

In each embodiment wherein a single panel includes a plurality of woven fibrous layers or a plurality of single-layer, consolidated fiber networks, the multiple layers may be adjoined in a bonded array or may juxtaposed in a non-bonded array. Methods of bonding are well known in the art, and include stitching, quilting, bolting, adhering with adhesive materials, and the like. Preferably, said plurality of layers are attached by stitching together at edge areas of the layers. Further, each individual panel may be adjoined in a bonded array using the same techniques, or may juxtaposed in a non-bonded array.

For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, a "yarn" is a strand of interlocked fibers. An "array" describes an orderly arrangement of fibers or yarns, and a "parallel array" describes an orderly parallel arrangement of fibers or yarns. A fiber "layer" describes a planar arrangement of woven or non-woven fibers or yarns. A fiber "network" denotes a plurality of interconnected fiber or yarn layers. A "consolidated network" describes a consolidated combination of fiber layers with a matrix composition. As used herein, a "single layer" structure refers to structure composed of one or more individual fiber layers that have been consolidated into a single unitary structure. In general, a "fabric" may relate to either a woven or non-woven material.

In accordance with the invention, each of the fibers present in each non-woven fibrous layer has one or more surfaces, and the surfaces of the fibers are coated with a polymeric matrix composition that is resistant to dissolution by water, and resistant to dissolution by one or more organic solvents. More specifically, the outer surface of each fiber is substantially coated with said water and organic solvent resistant polymeric matrix composition such that preferably 100% of the surface area of each individual fiber is covered by said polymeric matrix composition. If the non-woven fibrous layers comprise a plurality of yarns, each fiber forming a single strand of yarn is coated with the polymeric matrix composition.

For the purposes of the present invention, the term "coated" is not intended to limit the method by which the polymeric matrix composition is applied onto the fiber surface or surfaces. The application of the matrix is conducted prior to consolidating the fiber layers, and any appropriate method of applying the polymeric matrix composition onto the fiber surfaces may be utilized. Accordingly, the fibers of the invention are coated on, impregnated with, embedded in, or otherwise applied with a matrix composition by applying the matrix composition to the fibers and then consolidating the matrix composition-fibers combination to form a composite. By "consolidating" is meant that the matrix material and each individual fiber layer are combined into a single unitary layer. Consolidation can occur via drying, cooling, heating, pressure or a combination thereof. The term "composite" refers to consolidated combinations of fibers with the matrix material. The term "matrix" as used herein is well known in the art, and is used to represent a binder material, such as a polymeric binder material, that binds the fibers together after consolidation.

With regard to the woven fibrous layers, it is generally not necessary for the fibers to be coated with the polymeric matrix composition, because no consolidation is conducted. However, it is within the scope of the invention that the fibers comprising the woven fibrous layers may be coated with a polymeric matrix composition, preferably with a polymeric composition that is resistant to dissolution by water, and resistant to dissolution by one or more organic solvents.

As described herein, the polymeric matrix composition is independently resistant to dissolution by, particularly sea water, and independently resistant to dissolution by one or more organic solvents, such as diesel or non-diesel gasoline, gun lube, petroleum and organic solvents derived from petroleum. The polymeric matrix composition is also preferably resistant to dissolution by a combination of water and one or more organic solvents. Conventionally, there are two types of polymers which are predominantly used in the manufacture of soft body armor, i.e. solvent-based and water-based synthetic rubbers; and polyurethane (typically water-based). Such synthetic rubbers are generally block copolymers of styrene and isoprene, particularly styrene-isoprene-styrene (SIS) copolymers. These SIS copolymers are processed in both solvent-based solutions and water-based dispersions. Solvent-based synthetic rubbers are generally sensitive to petroleum solvents and will dissolve upon exposure. Such solvent-based synthetic rubbers are generally unaffected by water. However, water-based dispersions can be very sensitive to water and sea water, depending on the method and materials of dispersion. Currently employed polyurethane matrix polymers, due to their inherent polarity, are generally resistant to petroleum solvents, with some exceptions. Water-based polyurethanes can be degraded by water, particularly sea water, which can cause a hydrolytic breakdown of the polyurethane chain, resulting in a reduction in both molecular weight and physical properties.

It has been unexpectedly found that polymers which are both polar and hydrolytically stable achieve the desired balance of water resistance and organic solvent resistance, while maintaining the desired ballistic resistance properties necessary for an effective ballistic resistant article. Polar polymers are generally resistant to dissolution by non-polar organic solvents, and hydrolytically stable polymers are stable to hydrolysis by water, i.e. resistant to chemical decomposition when exposed to water. Accordingly, ballistic resistant articles formed incorporating such polymeric matrix materials retain their ballistic resistance properties after prolonged exposure to such liquids.

In the preferred embodiments of the invention, suitable polymeric matrix compositions preferably include synthetic rubbers, diene rubbers and styrenic block copolymers including styrene-isoprene-styrene (SIS) and styrene-butadiene-styrene (SBS), polar vinyl-based polymers, polar acrylic polymers, polyvinyl chloride homopolymer, polyvinyl chloride copolymer, polyvinyl chloride terpolymer, polyvinyl butyral, polyvinylidene chloride, polyvinylidene fluoride polar ethylene vinyl acetate copolymers, polar ethylene acrylic acid copolymers, silicone, thermoplastic polyurethanes, nitrile rubber, polychloroprenes such as Neoprene (manufactured by DuPont), polycarbonates, polyketones, polyamides, cellulosics, polyimides, polyesters, epoxies, alkyds, phenolics, polyacrylonitrile, polyether sulfones and combinations thereof.

Also suitable are other polar, hydrolytically stable polymers not specified herein. Non-polar synthetic rubbers and styrenic block copolymers, such as SIS and SBS, generally should be modified with polar groups, such as by the grafting of carboxyl groups or adding acid or alcohol functionality, or any other polar group, to be sufficiently oil repellant. For example, non-polar polymers may be copolymerized with monomers containing carboxylic acid groups such as acrylic acid or maleic acid, or another polar group such as amino, nitro or sulfonate groups. Such techniques are well known in the art.

Particularly preferred are polar polymers which have a C-C polymer backbone. As stated herein, polar polymers are generally resistant to dissolution by non-polar organic solvents. Polymers having a C-C-backbone, such as vinyl-based polymers including, for example, acrylics, ethylene vinyl acetate, polyvinylidene chloride, etc., have a hydrolytically stable molecular structure. Also particularly preferred are polar, thermoplastic polyurethanes, particularly those that have been formulated to enhance hydrolytic stability. Unlike C-C linkages, urethane linkages and ester linkages are generally susceptible hydrolytic degradation. Accordingly, polymers having such linkages generally are formulated or modified to enhance water repellency and hydrolytic stability. For example, polyurethanes may be formulated to enhance hydrolytic stability through copolymerization with polyether polyol or aliphatic polyol components, or other components known to enhance hydrolytic stability. The main polyurethane producing reaction is between an aliphatic or aromatic diisocyanate and a polyol, typically a polyethylene glycol or polyester polyol, in the presence of catalysts. Selection of the isocyanate co-reactant can also influence the hydrolytic stability. Bulky pendant groups on either or both of the co-reactants can also protect the urethane linkage from attack. Polyurethane can be made in a variety of densities and hardnesses by varying the type of monomers used and by adding other substances to modify their characteristics or enhance their hydrolytic stability, such as with water repellants, pH buffers, cross-linking agents and chelating agents, etc. The most preferred polyurethane matrix composition comprises a polar, hydrolytically stable, polyether- or aliphatic-based thermoplastic polyurethane, which are preferred over polyester-based polyurethanes.

The thermoplastic polyurethane may be a homopolymer, a copolymer, or a blend of a polyurethane homopolymer and a polyurethane copolymer. Such polymers are commercially available. Such polyurethanes are generally available as aqueous solutions, dispersions or emulsions, in which the solids component may range from about 20% to 80% by weight, more preferably from about 40% to about 60% by weight, with the remaining weight being water. An aqueous system is preferred for ease of use. Preferred polyurethane coated fibrous layers are described in U.S. patent application Ser. No. 11/213,253, which is incorporated herein by reference in its entirety.

Useful polymeric matrix compositions include both low modulus, thermoplastic matrix materials and high modulus, thermosetting matrix materials having the above desired properties, or a combination thereof. Suitable thermoplastic matrix compositions preferably have an initial tensile modulus of less than about 6,000 psi (41.3 MPa), and suitable high modulus, thermosetting compositions preferably have an initial tensile modulus of at least about 300,000 psi (2068 MPa), each as measured at 37° C. by ASTM D638. As used herein throughout, the term tensile modulus means the modulus of elasticity as measured by ASTM D638 for a matrix material. For the manufacture of soft body armor, low modulus thermoplastic matrix compositions are most preferred. Preferred low modulus thermoplastic compositions have a tensile modulus of about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the preferred thermoplastic matrix composition is preferably less than about 0° C., more preferably the less than about −40° C., and most preferably less than about −50° C. Preferred thermoplastic compositions also have a preferred elongation to break of at least about 50%, more preferably at least about 100% and most preferably an elongation to break of at least about 300%.

The rigidity, impact and ballistic properties of the articles formed from the fabric composites of the invention are effected by the tensile modulus of the matrix polymer. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without a matrix. However, low tensile modulus matrix polymers also yield lower rigidity composites. Further, in certain applications, particularly those where a composite must function in both anti-ballistic and structural modes, there is needed a superior combination of ballistic resistance and rigidity. Accordingly, the most appropriate type of matrix polymer to be used will vary depending on the type of article to be formed from the fabrics of the invention. In order to achieve a compromise in both properties, a suitable matrix composition may combine both low modulus and high modulus materials to form a single matrix composition, so long as the combination produces a polymeric matrix composition that is resistant to dissolution by water and resistant to dissolution by one or more organic solvents.

In the preferred embodiment of the invention, the proportion of the matrix composition making up each non-woven composite panel preferably comprises from about 5% to about 30% by weight of the composite, more preferably from about 7% to about 20% by weight of the composite, more preferably from about 7% to about 16% and most preferably from about 11% to about 15% by weight of the composite. The matrix composition may also include fillers such as carbon black or silica, may be extended with oils, or may be vulcanized by sulfur, peroxide, metal oxide or radiation cure systems as is well known in the art.

The remaining portion of the composite is preferably composed of fibers. In accordance with the invention, the fibers comprising each of the woven and non-woven fibrous layers preferably comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include extended chain polyolefin fibers, such as highly oriented, high molecular weight polyethylene fibers, particularly ultra-high molecular weight polyethylene fibers, and ultra-high molecular weight polypropylene fibers. Also suitable are aramid fibers, particularly para-aramid fibers, extended chain polyvinyl alcohol fibers, extended chain polyacrylonitrile fibers, polybenzazole fibers, such as polybenzoxazole (PBO) and polybenzothiazole (PBT) fibers, and liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark Spectra® from Honeywell International Inc. Spectra® fibers are well known in the art and are described, for example, in U.S. Pat. Nos. 4,623,547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by Dupont corporation under the trade name of KEVLAR®. Also useful in the practice of this invention are poly(m-phenylene isophthalamide) fibers produced commercially by Dupont under the trade name NOMEX® and fibers produced commercially by Teijin under the trade name TWARON®.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and are widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous layers may be formed from a combination of Spectra® fibers and Kevlar® fibers. M5® fibers are manufactured by Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene Spectra® fibers, and aramid Kevlar® fibers. The fibers may be of any suitable denier, such as, for example, 50 to about 3000 denier, more preferably from about 200 to 3000 denier, still more preferably from about 650 to about 1500 denier, and most preferably from about 800 to about 1300 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

As discussed above, the matrix may be applied to a fiber in a variety of ways, and the term "coated" is not intended to limit the method by which the matrix composition is applied onto the fiber surface or surfaces. For example, the polymeric matrix composition may be applied in solution form by spraying or roll coating a solution of the matrix composition onto fiber surfaces, wherein a portion of the solution comprises the desired polymer or polymers and a portion of the solution comprises a solvent capable of dissolving the polymer or polymers, followed by drying. Another method is to apply a neat polymer of the coating material to fibers either as a liquid, a sticky solid or particles in suspension or as a fluidized bed. Alternatively, the coating may be applied as a solution or emulsion in a suitable solvent which does not adversely affect the properties of the fiber at the temperature of application. For example, the fiber can be transported through a solution of the matrix composition to substantially coat the fiber and then dried to form a coated fiber. The resulting coated fiber can then be arranged into the desired network configuration. In another coating technique, a layer of fibers may first be arranged, followed by dipping the layer into a bath of a solution containing the matrix composition dissolved in a suitable solvent, such that each individual fiber is substantially coated with the matrix composition, and then dried through evaporation of the solvent. The dipping procedure may be repeated several times as required to place a desired amount of matrix composition coating on the fibers, preferably encapsulating each of the individual fibers or covering 100% of the fiber surface area with the matrix composition.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using the gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fiber may be extruded into a fluidized bed of an appropriate polymeric powder. Furthermore, if a stretching operation or other manipulative process, e.g. solvent exchanging, drying or the like is conducted, the coating may be applied to a precursor material of the final fiber. In the most preferred embodiment of the invention, the fibers of the invention are first coated with the matrix composition, followed by arranging a plurality of fibers into either a woven or non-woven fiber layer. Such techniques are well known in the art.

Following the application of the matrix material, the individual fibers in a non-woven layer may or may not be bonded to each other prior to consolidation. In the panels of the invention which comprise non-woven fibrous layers, each non-woven layer comprises fibers unidirectionally aligned in parallel to one another along a common fiber direction. As is conventionally known in the art, excellent ballistic resistance is achieved when individual fiber layer are cross-plied such that the fiber alignment direction of one layer is rotated at an angle with respect to the fiber alignment direction of another layer. Accordingly, successive layers of such unidirectionally aligned fibers are preferably rotated with respect to a previous layer. An example is a two layer structure wherein adjacent layers are aligned in a 0°/90° orientation. However, adjacent layers can be aligned at virtually any angle between about 0° and about 90° with respect to the longitudinal fiber direction of another layer. For example, a five layer non-woven structure may have plies at a 0°/45°/90°/45°/0° orientation or at other angles. In the preferred embodiment of the invention, only two individual non-woven layers, cross plied at 0° and 90°, are consolidated into a single layer network, wherein one or more of said single layer networks make up a single non-woven panel. However, it should be understood that the single-layer consolidated networks of the invention may generally include any number of cross-plied layers, such as about 20 to about 40 or more layers as may be desired for various applications. Such rotated unidirectional alignments are described, for example, in U.S. Pat. Nos. 4,457,985; 4,748,064; 4,916,000; 4,403,012; 4,623,573; and 4,737,402. The non-woven fiber networks can be constructed using well known methods, such as by the methods described in U.S. Pat. No. 6,642,159. The non-woven fiber networks may also comprise a felted structure which is formed using conventionally known techniques, comprising fibers in a random orientation embedded in a suitable matrix composition.

The woven fibrous layers of the invention are also formed using techniques that are well known in the art using any fabric weave, such as plain weave, crowfoot weave, basket weave, satin weave, twill weave and the like. Plain weave is most common. Prior to weaving, the individual fibers of each woven fibrous material may or man not be coated with a polymeric matrix composition in a similar fashion as the non-woven fibrous layers using the same matrix compositions as the non-woven fibrous layers. However, if the individual woven fibers are not coated in a matrix composition, it is preferred that at least one outer surface of each woven layer be coated or applied with a water repellent coating for additional protection. Suitable water repellent coatings non-exclusively include commonly known hydrolytically stable materials, and may comprise the above described polymeric matrix compositions.

Suitable bonding conditions for consolidating the fiber layers into a single layer, consolidated network, or fabric composite, include conventionally known lamination techniques. A typical lamination process includes pressing the cross-plied fiber layers together at about 110° C., under about 200 psi (1379 kPa) pressure for about 30 minutes. The consolidation of the fibers layers of the invention is preferably conducted at a temperature from about 200° F. (~93° C.) to about 350° F. (~177° C.), more preferably at a temperature from about 200° F. to about 300° F. (~149° C.) and most preferably at a temperature from about 200° F. to about 280° F. (~121° C.), and at a pressure from about 25 psi (~172 kPa) to about 500 psi (3447 kPa) or higher. The consolidation may be conducted in an autoclave, as is conventionally known in the art. When heating, it is possible that the matrix can be caused to stick or flow without completely melting. However, generally, if the matrix material is caused to melt, relatively little pressure is required to form the composite, while if the matrix material is only heated to a sticking point, more pressure is typically required. The consolidation step may generally take from about 10 seconds to about 24 hours. However, the temperatures, pressures and times are generally dependent on the type of polymer, polymer content, process and type of fiber.

The thickness of the individual fabric layers and panels will correspond to the thickness of the individual fibers. Accordingly, a preferred woven fibrous layer will have a preferred thickness of from about 25 µm to about 500 µm, more preferably from about 75 µm to about 385 µm and most preferably from about 125 µm to about 255 µm. A preferred single-layer, consolidated network will have a preferred thickness of from about 12 µm to about 500 µm, more preferably from about 75 µm to about 385 µm and most preferably from about 125 µm to about 255 µm The combined hybrid article has a preferred total thickness of about 63 µm to about 1000 µm, more preferably from about 125 µm to about 850 µm and most preferably from about 250 µm to about 725 µm.

While such thicknesses are preferred, it is to be understood that other film thicknesses may be produced to satisfy a particular need and yet fall within the scope of the present invention.

The multi-panel structures of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758.

The multi-panel structures are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions. As used herein, "soft" or "flexible" armor is armor that does not retain its shape when subjected to a significant amount of stress and is incapable of being free-standing without collapsing. The multi-panel structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as unattached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus matrix composition. Hard articles like helmets and armor are preferably formed using a high tensile modulus matrix composition.

The ballistic resistance properties are determined using standard testing procedures that are well known in the art. Particularly, the protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite panel divided by the surface area, the higher the $V_{50}$, the better the resistance of the composite. The ballistic resistant properties of the articles of the invention will vary depending on many factors, particularly the type of fibers used to manufacture the fabrics. However, it has been found that the use of a polymeric matrix composition that is resistant to dissolution by water, and resistant to dissolution by one or more organic solvents does not negatively affect the ballistic properties of the articles of the invention.

Flexible ballistic armor formed herein preferably have a $V_{50}$ of at least about 1920 feet/second (fps) (585.6 msec) when impacted with a 16 grain projectile, after the armor has been submerged in sea water for 24 hours at 70° F.±5° F. (21° C.±2.8° C.). The flexible ballistic armor of the invention is also preferably characterized in retaining at least about 85%, more preferably at least about 90% of its $V_{50}$ performance after immersion in tap water at 70° F.±5° F. (21° C.±2.8° C.) for 20 hours when impacted with a 17 grain fragment simulated projectile (fsp). Under these conditions, the flexible ballistic armor also exhibits a weight increase of preferably not more than 50%, and more preferably not more than about 40% from its dry weight. Moreover, the flexible ballistic armor of the invention preferably is characterized in retaining at least about 85%, more preferably at least about 90%, of its $V_{50}$ performance after immersion in gasoline at 70° F.±5° F. (21° C.±2.8° C.) for 4 hours, when impacted with a 16 grain projectile.

The following non-limiting examples serve to illustrate the invention.

Example 1

The ballistic performance of a three-panel, woven aramid/non-woven aramid/woven aramid hybrid flexible shoot pack was tested against a 9 mm, 129 grain FMJ bullet. The panels were tack stitched together at the four corners of the shoot pack. The length and width of the flexible shoot pack was 15"×15" (38.1 cm×38.1 cm) with a thickness of about ½" (12.7 mm). The test standard was Military Standard MIL-STD-662F. Each woven aramid layer was aramid Style 706 in a plain weave fabric construction (600 denier; pick count: 34×34 ends/inch (2.54 mm); areal weight: 180 g/m$^2$), commercially available from Hexcel Corporation of Stamford, Conn., and was formed from Kevlar® KM2 fibers, available from E. I. du Pont de Nemours and Company of Wilmington, Del. Each non-woven aramid layer was Gold Shield® GN 2115, (water-based thermoplastic polyurethane matrix; areal weight: 112 g/m$^2$) commercially available from Honeywell International, Inc. of Morristown, N.J. The total areal weight of the shoot pack was 1.09 lb/ft$^2$ (5320 g/m$^2$). Accordingly, the total shoot pack content of Style 706 woven aramid was approximately 75% by weight, and the total shoot pack content of Gold Shield® GN 2115 was about 25% by weight. The test results for the hybrid shoot pack is summarized in Table 1 below.

Example 2

A similar three-panel hybrid shoot pack as described in Example 1 was tested against a 2 grain Right Circular Cylinder fragment. The test standard was Military Standard MIL-STD-662F. The data is summarized in Table 1 below.

Example 3

A similar three-panel hybrid shoot pack as described in Example 1 was tested against a 4 grain Right Circular Cylinder fragment. The test standard was Military Standard MIL-STD-662F. The data is summarized in Table 1 below.

Example 4

A similar three-panel hybrid shoot pack as described in Example 1 was tested against a 16 grain Right Circular Cylinder fragment. The test standard was Military Standard MIL-STD-662F. The data is summarized in Table 1 below.

Example 5

A similar three-panel hybrid shoot pack as described in Example 1 was tested against a 64 grain Right Circular Cylinder fragment. The test standard was Military Standard MIL-STD-662F. The data is summarized in Table 1 below.

Example 6

A similar three-panel hybrid shoot pack as described in Example 1 was tested against a 17 grain Fragment Simulated Projectile fragment. The test standard was Military Standard MIL-STD-662F. The data is summarized in Table 1 below.

Example 7

A similar three-panel hybrid shoot pack as described in Example 1 was tested against a 16 grain Right Circular Cylinder fragment after soaking the shoot pack for 4 hours in gasoline, followed by drip-drying for 15 minutes. The test standard was Military Standard MIL-STD-662F. The data is summarized in Table 1 below.

Example 8

A similar three-panel hybrid shoot pack as described in Example 1 was tested against a 2 grain Right Circular Cylinder fragment after soaking the shoot pack in sea water for 24 hours, followed by drip-drying for 15 minutes. The test standard was Military Standard MIL-STD-662F. The data is summarized in Table 1.

TABLE 1

| Example Number | Material | Layers | V50 (ft/sec) (fps) |
|---|---|---|---|
| 1 | Hybrid of Style 706 + GN 2115 + Style 706 | 11 + 12 + 11 | 1636 |
| 2 | Hybrid of Style 706 + GN 2115 + Style 706 | 11 + 12 + 11 | 2591 |
| 3 | Hybrid of Style 706 + GN 2115 + Style 706 | 11 + 12 + 11 | 2531 |
| 4 | Hybrid of Style 706 + GN 2115 + Style 706 | 11 + 12 + 11 | 2147 |
| 5 | Hybrid of Style 706 + GN 2115 + Style 706 | 11 + 12 + 11 | 1766 |
| 6 | Hybrid of Style 706 + GN 2115 + Style 706 | 11 + 12 + 11 | 2034 |
| 7 | Hybrid of Style 706 + GN 2115 + Style 706 | 11 + 12 + 11 | 1977 |
| 8 | Hybrid of Style 706 + GN 2115 + Style 706 | 11 + 12 + 11 | 2348 |

Example 9

The ballistic performance of an un-soaked three-panel, woven aramid/non-woven aramid/woven aramid hybrid flexible shoot pack was tested against a 2 grain Right Circular Cylinder fragment. The panels were tack stitched together at the four corners of the shoot pack. The length and width of the flexible shoot pack was 15"×15" (38.1 cm×38.1 cm) with a thickness of about ½" (12.7 mm). The shoot pack construction included a non-woven panel having 24 layers of Gold Shield® GN 2115 sandwiched between two woven panels, each woven panel having 7 layers of woven aramid Style 706. The test standard was Military Standard MIL-STD-662F. The total areal weight of the shoot pack was 1.09 lb/ft$^2$ (5320 g/m$^2$). Accordingly, the total shoot pack content of Style 706 woven aramid was approximately 50% by weight, and the total shoot pack content of Gold Shield® GN 2115 was about 50% by weight. The test results for the hybrid shoot pack is summarized in Table 2 below.

Example 10

A similar three-panel hybrid shoot pack as described in Example 9 was tested against a 2 grain Right Circular Cylinder fragment after soaking in sea water for 24 hours, followed by drip-drying for 15 minutes. The test standard was Military Standard MIL-STD-662F. The test results for the hybrid shoot pack is summarized in Table 2 below.

Example 11

A similar un-soaked three-panel hybrid shoot pack as described in Example 9 was tested against a 4 grain Right Circular Cylinder fragment. The test standard was Military Standard MIL-STD-662F. The test results for the hybrid shoot pack is summarized in Table 2 below.

Example 12

A similar three-panel hybrid shoot pack as described in Example 9 was tested against a 4 grain Right Circular Cylinder fragment after soaking in sea water for 24 hours, followed by drip-drying for 15 minutes. The test standard was Military Standard MIL-STD-662F. The test results for the hybrid shoot pack is summarized in Table 2 below.

Example 13

A similar un-soaked three-panel hybrid shoot pack as described in Example 9 was tested against a 16 grain Right Circular Cylinder fragment. The test standard was Military Standard MIL-STD-662F. The test results for the hybrid shoot pack is summarized in Table 2 below.

Example 14

A similar three-panel hybrid shoot pack as described in Example 9 was tested against a 16 grain Right Circular Cylinder fragment after soaking in sea water for 24 hours, followed by drip-drying for 15 minutes. The test standard was Military Standard MIL-STD-662F. The test results for the hybrid shoot pack is summarized in Table 2 below.

Example 15

A similar un-soaked three-panel hybrid shoot pack as described in Example 9 was tested against a 64 grain Right Circular Cylinder fragment. The test standard was Military Standard MIL-STD-662F. The test results for the hybrid shoot pack is summarized in Table 2 below.

Example 16

A similar three-panel hybrid shoot pack as described in Example 9 was tested against a 64 grain Right Circular Cylinder fragment after soaking in sea water for 24 hours, followed by drip-drying for 15 minutes. The test standard was Military Standard MIL-STD-662F. The test results for the hybrid shoot pack is summarized in Table 2 below.

TABLE 2

| Example Number | Shoot Pack Construction | Soaked in Sea Water | Layers | V50 (ft/sec) (fps) |
|---|---|---|---|---|
| 9 | Hybrid of Style 706 + GN 2115 + Style 706 | No | 7 + 24 + 7 | 2634 |
| 10 | Hybrid of Style 706 + GN 2115 + Style 706 | Yes | 7 + 24 + 7 | 2474 |
| 11 | Hybrid of Style 706 + GN 2115 + Style 706 | No | 7 + 24 + 7 | 2450 |
| 12 | Hybrid of Style 706 + GN 2115 + Style 706 | Yes | 7 + 24 + 7 | 2107 |
| 13 | Hybrid of Style 706 + GN 2115 + Style 706 | No | 7 + 24 + 7 | 2138 |
| 14 | Hybrid of Style 706 + GN 2115 + Style 706 | Yes | 7 + 24 + 7 | 1906 |
| 15 | Hybrid of Style 706 + GN 2115 + Style 706 | No | 7 + 24 + 7 | 1776 |
| 16 | Hybrid of Style 706 + GN 2115 + Style 706 | Yes | 7 + 24 + 7 | 1572 |

Example 17

The ballistic performance of a three-panel, woven aramid/non-woven aramid/woven aramid hybrid flexible shoot pack was tested against a 2 grain Right Circular Cylinder fragment after soaking in sea water for 24 hours, followed by drip-drying for 15 minutes. The panels were tack stitched together at the four corners of the shoot pack. The length and width of the flexible shoot pack was 15"×15" (38.1 cm×38.1 cm) with a thickness of about ½" (12.7 mm). The shoot pack construction included a non-woven panel having 12 layers of Gold Shield® GN 2115 sandwiched between two woven panels comprising aramid Style 751 in a plain weave construction (600 denier; pick count: 29×29 ends/inch (2.54 mm); areal weight: 152.6 g/m$^2$ (4.5 oz/yd$^2$)) which is formed from Kevlar® KM2 fibers and is commercially available from Hexcel Corporation of Stamford, Conn., with each woven panel comprising 13 layers of aramid style 751. The test standard was Military Standard MIL-STD-662F. The total areal weight of the shoot pack was 1.07 lb/ft$^2$ (5320 g/m$^2$). Accordingly, the total shoot pack content of Style 751 woven aramid was approximately 76% by weight, and the total shoot pack content of Gold Shield® GN 2115 was about 24% by weight. The test results for the hybrid shoot pack is summarized in Table 3 below.

Example 18

A similar three-panel hybrid shoot pack as described in Example 17 was tested against a 4 grain Right Circular Cylinder fragment after soaking in sea water for 24 hours, followed by drip-drying for 15 minutes. The test standard was Military Standard MIL-STD-662F. The test results for the hybrid shoot pack is summarized in Table 3 below.

Example 19

A similar three-panel hybrid shoot pack as described in Example 17 was tested against a 16 grain Right Circular Cylinder fragment after soaking in sea water for 24 hours, followed by drip-drying for 15 minutes. The test standard was Military Standard MIL-STD-662F. The test results for the hybrid shoot pack is summarized in Table 3 below.

Example 20

A similar three-panel hybrid shoot pack as described in Example 17 was tested against a 64 grain Right Circular Cylinder fragment after soaking in sea water for 24 hours, followed by drip-drying for 15 minutes. The test standard was Military Standard MIL-STD-662F. The test results for the hybrid shoot pack is summarized in Table 3 below.

TABLE 3

| Example Number | Material | Layers | V50 (ft/sec) (fps) |
| --- | --- | --- | --- |
| 17 | Hybrid of Style 751 + GN 2115 + Style 751 | 13 + 12 + 13 | 2606 |
| 18 | Hybrid of Style 751 + GN 2115 + Style 751 | 13 + 12 + 13 | 2385 |
| 19 | Hybrid of Style 751 + GN 2115 + Style 751 | 13 + 12 + 13 | 2087 |
| 20 | Hybrid of Style 751 + GN 2115 + Style 751 | 13 + 12 + 13 | 2650 |

Example 21

The ballistic performance of a three-panel, woven aramid/non-woven aramid/woven aramid hybrid flexible shoot pack was tested against a 2 grain Right Circular Cylinder fragment after soaking in sea water for 24 hours, followed by drip-drying for 15 minutes. The panels were tack stitched together at the four corners of the shoot pack. The length and width of the flexible shoot pack was 15"×15" (38.1 cm×38.1 cm) with a thickness of about ½" (12.7 mm). The shoot pack construction included a non-woven panel having 17 layers of Gold Shield® GN 2115 sandwiched between two woven panels comprising aramid Style 751, commercially available from Hexcel Corporation of Stamford, Conn., with each woven panel comprising 11 layers of aramid style 751. The test standard was Military Standard MIL-STD-662F. The total areal weight of the shoot pack was 1.07 lb/ft$^2$ (5320 g/m$^2$). Accordingly, the total shoot pack content of Style 751 woven aramid was approximately 65% by weight, and the total shoot pack content of Gold Shield® GN 2115 was about 35% by weight. The test results for the hybrid shoot pack is summarized in Table 4 below.

Example 22

A similar three-panel hybrid shoot pack as described in Example 21 was tested against a 4 grain Right Circular Cylinder fragment after soaking in sea water for 24 hours, followed by drip-drying for 15 minutes. The test standard was Military Standard MIL-STD-662F. The test results for the hybrid shoot pack is summarized in Table 4 below.

Example 23

A similar three-panel hybrid shoot pack as described in Example 21 was tested against a 16 grain Right Circular Cylinder fragment after soaking in sea water for 24 hours, followed by drip-drying for 15 minutes. The test standard was Military Standard MIL-STD-662F. The test results for the hybrid shoot pack is summarized in Table 4 below.

Example 24

A similar three-panel hybrid shoot pack as described in Example 21 was tested against a 64 grain Right Circular Cylinder fragment after soaking in sea water for 24 hours, followed by drip-drying for 15 minutes. The test standard was Military Standard MIL-STD-662F. The test results for the hybrid shoot pack is summarized in Table 4 below.

TABLE 4

| Example Number | Material | Layers | V50 (ft/sec) (fps) |
| --- | --- | --- | --- |
| 21 | Hybrid of Style 751 + GN 2115 + Style 751 | 11 + 17 + 11 | 2738 |
| 22 | Hybrid of Style 751 + GN 2115 + Style 751 | 11 + 17 + 11 | 2360 |
| 23 | Hybrid of Style 751 + GN 2115 + Style 751 | 11 + 17 + 11 | 2014 |
| 24 | Hybrid of Style 751 + GN 2115 + Style 751 | 11 + 17 + 11 | 1706 |

The above examples collectively illustrate that the hybrid shoot packs retain excellent ballistic resistance properties even after being soaked in either seawater or gasoline.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:
1. A ballistic resistant article comprising, in order:
   a) a first panel comprising at least one woven fibrous layer;
   b) a second panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; and
   c) a third panel comprising at least one woven fibrous layer.
2. The ballistic resistant article of claim 1 wherein one or more of said organic solvents is derived from petroleum.
3. The ballistic resistant article of claim 1 wherein the first panel is in juxtaposition with the second panel and the second panel is in juxtaposition with the third panel.
4. The ballistic resistant article of claim 1 wherein the first panel is in immediate juxtaposition with the second panel and the second panel is in immediate juxtaposition with the third panel.
5. The ballistic resistant article of claim 1 wherein the first panel is attached to the second panel and the second panel is attached to the third panel.
6. The ballistic resistant article of claim 1 wherein said polymeric composition comprises a polar, vinyl-based polymer.
7. The ballistic resistant article of claim 1 wherein said polymeric composition comprises a diene rubber modified with polar groups, a styrenic block copolymer modified with polar groups, a polar vinyl-based polymer, a polar acrylic polymer, a polyvinyl chloride homopolymer, a polyvinyl chloride copolymer, a polyvinyl chloride terpolymer, polyvinyl butyral, polyvinylidene chloride, polyvinylidene fluoride, a polar ethylene vinyl acetate copolymer, a polar ethylene acrylic acid copolymer, silicone, a thermoplastic polyurethane, a nitrile rubber, a polychloroprene, a polycarbonate, a polyketone, a polyamide, a cellulosic, a polyimide, a polyester, an epoxy, an alkyd, a phenolic, a polyacrylonitrile, a polyether sulfone or a combination thereof.
8. The ballistic resistant article of claim 1 wherein said polymeric composition comprises a hydrolytically stable thermoplastic polyurethane.
9. The ballistic resistant article of claim 1 wherein said first panel, second panel and third panel each comprise fibers having a tenacity of about 7 g/denier or more and a tensile modulus of about 150 g/denier or more.
10. The ballistic resistant article of claim 1 wherein said first panel, second panel and third panel each independently comprise one or more polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, glass fibers, carbon fibers, rigid rod fibers, or a combination thereof.
11. The ballistic resistant article of claim 1 wherein said first panel, second panel and third panel each comprise aramid fibers.
12. The ballistic resistant article of claim 1 wherein said first panel, second panel and third panel each comprise polyethylene fibers.
13. The ballistic resistant article of claim 1 wherein said polymeric composition comprises from about 7% to about 20% by weight of the second panel.
14. The ballistic resistant article of claim 1 wherein said second panel comprises a plurality of unidirectional, non-woven fiber layers that are cross-plied at a 90° angle relative to a longitudinal fiber direction of each adjacent fiber layer.
15. The ballistic resistant article of claim 1 comprising at least one additional panel juxtaposed with said third panel, the at least one additional panel comprising:
   i) at least one woven fibrous layer; or
   ii) a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; or
   iii) both an additional panel comprising i) and an additional panel comprising ii).
16. The ballistic resistant article of claim 1 which comprises flexible armor.
17. The ballistic resistant article of claim 1 wherein the second panel comprises fibers having 100% of their surface area coated with said polymeric composition.
18. The ballistic resistant article of claim 1 wherein said polymeric composition comprises a diene rubber modified with polar groups, a styrenic block copolymer modified with polar groups, a polar vinyl-based polymer, a polar acrylic polymer, a polyvinyl chloride homopolymer, a polyvinyl chloride copolymer, a polyvinyl chloride terpolymer, polyvinyl butyral, polyvinylidene chloride, polyvinylidene fluoride, a polar ethylene vinyl acetate copolymer, a polar ethylene acrylic acid copolymer, silicone, a thermoplastic polyurethane, a nitrile rubber, a polychloroprene, a polycarbonate, a polyketone, a polyamide, a cellulosic, a polyimide, a polyester, an epoxy, an alkyd, a phenolic, a polyacrylonitrile, a polyether sulfone or a combination thereof.
19. A ballistic resistant article comprising, in order:
   a) a first panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents;
   b) a second panel comprising at least one woven fibrous layer; and
   c) a third panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents.
20. The ballistic resistant article of claim 19 wherein one or more of said organic solvents is derived from petroleum.

21. The ballistic resistant article of claim 19 wherein the first panel is in juxtaposition with the second panel and the second panel is in juxtaposition with the third panel.

22. The ballistic resistant article of claim 19 wherein the first panel is in immediate juxtaposition with the second panel and the second panel is in immediate juxtaposition with the third panel.

23. The ballistic resistant article of claim 19 wherein the first panel is attached to the second panel and the second panel is attached to the third panel.

24. The ballistic resistant article of claim 19 wherein said polymeric composition comprises a polar, vinyl-based polymer.

25. The ballistic resistant article of claim 19 wherein said polymeric composition comprises a hydrolytically stable, thermoplastic polyurethane.

26. The ballistic resistant article of claim 19 wherein said first panel, second panel and third panel each comprise fibers having a tenacity of about 7 g/denier or more and a tensile modulus of about 150 g/denier or more.

27. The ballistic resistant article of claim 19 wherein said first panel, second panel and third panel each independently comprise one or more polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, glass fibers, carbon fibers, rigid rod fibers, or a combination thereof.

28. The ballistic resistant article of claim 19 wherein said first panel, second panel and third panel each comprise aramid fibers.

29. The ballistic resistant article of claim 19 wherein said first panel, second panel and third panel each comprise polyethylene fibers.

30. The ballistic resistant article of claim 19 wherein said polymeric composition comprises from about 7% to about 20% by weight of each of the first panel and the third panel.

31. The ballistic resistant article of claim 19 wherein said first panel and said third panel comprise a plurality of unidirectional, non-woven fiber layers that are cross-plied at a 90° angle relative to a longitudinal fiber direction of each adjacent fiber layer.

32. The ballistic resistant article of claim 19 comprising at least one additional panel adjoining said third panel, the at least one additional panel comprising:
   i) at least one woven fibrous layer, or
   ii) a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; or
   iii) both an additional panel comprising i) and an additional panel comprising ii).

33. The ballistic resistant article of claim 19 which comprises flexible armor.

34. The ballistic resistant article of claim 19 wherein said first panel and said second panel comprise fibers having 100% of their surface area coated with said polymeric composition.

35. A method for forming a ballistic resistant article comprising:
   a) forming a first panel comprising at least one woven fibrous layer;
   b) forming a second panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents;
   c) forming a third panel comprising at least one woven fibrous layer; and
   d) juxtaposing said first panel with said second panel, and juxtaposing said second panel with said third panel.

36. The method of claim 35 wherein the first panel is attached to the second panel and the second panel is attached to the third panel.

37. The method of claim 35 further comprising juxtaposing at least one additional panel with said third panel, the at least one additional panel comprising:
   i) at least one woven fibrous layer; or
   ii) a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; or
   iii) juxtaposing both an additional panel comprising i) and an additional panel comprising ii) with said third panel.

38. A method for forming a ballistic resistant article comprising:
   a) forming a first panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents;
   b) forming a second panel comprising at least one woven fibrous layer;
   c) forming a third panel comprising a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; and
   d) juxtaposing said first panel with said second panel, and juxtaposing said second panel with said third panel.

39. The method of claim 38 wherein the first panel is attached to the second panel and the second panel is attached to the third panel.

40. The method of claim 38 further comprising juxtaposing at least one additional panel with said third panel, the at least one additional panel comprising:
   i) at least one woven fibrous layer; or ii) a plurality of non-woven fibrous layers, each of the non-woven fibrous layers being consolidated with the other non-woven fibrous layers, each of the non-woven fibrous layers comprising a unidirectional parallel array of fibers, each of said fibers having a surface, and the surfaces of said fibers being coated with a polymeric composition that comprises a hydrolytically stable, polar polymer which is resistant to dissolution by water, and resistant to dissolution by one or more organic solvents; or iii) juxtaposing both an additional panel comprising i) and an additional panel comprising ii) with said third panel.

* * * * *